July 24, 1962

C. A. MEAD ETAL 3,046,479

MOISTURE CONTENT METER

Filed Sept. 9, 1958

INVENTORS:
Carver A. Mead
Marvin L. McBrayer

Attorney

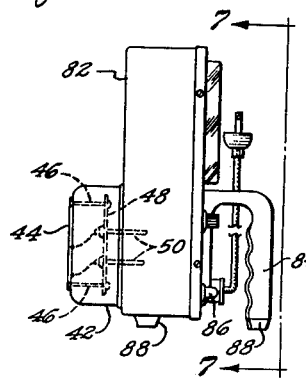
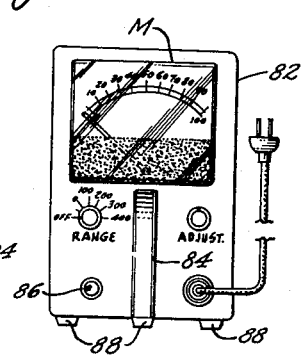
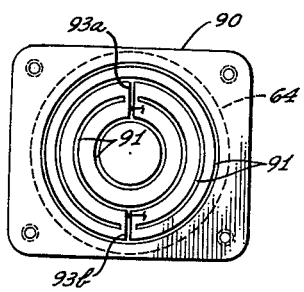
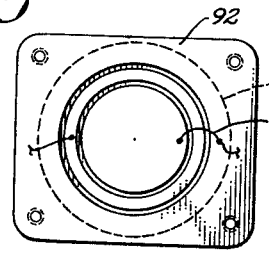
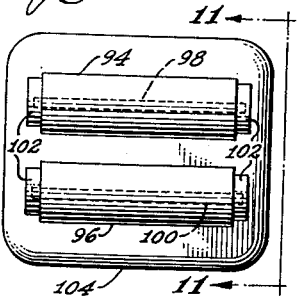
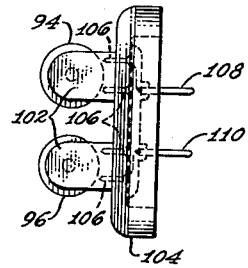
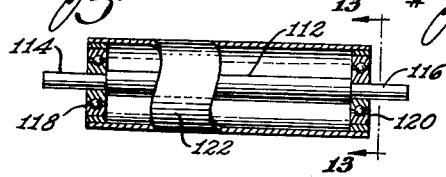
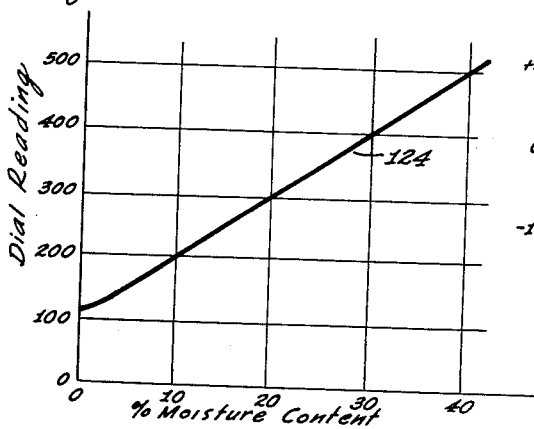
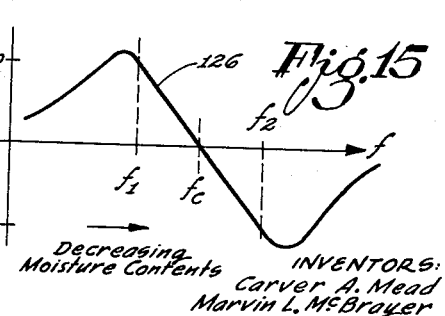

United States Patent Office 3,046,479
Patented July 24, 1962

3,046,479
MOISTURE CONTENT METER
Carver A. Mead, Pasadena, and Marvin L. McBrayer, Alhambra, Calif., assignors to Moisture Register Company, Alhambra, Calif., a corporation of California
Filed Sept. 9, 1958, Ser. No. 759,930
5 Claims. (Cl. 324—61)

Our invention relates generally to electrical meters and more particularly to a novel and useful moisture content meter for measuring the moisture content of a wide variety of materials.

In the manufacture of various materials such as paper, cloth, fiberboard, etc., it is often desirable and necessary to determine the moisture content of the material being produced. One method of doing this is to take a sample of the material and weigh it on a sensitive scale. The weight of the sample is then compared with its weight after it has been thoroughly dried to establish the original moisture content. This is, obviously, a very time consuming and tedious procedure. Further, it is not possible to obtain an accurate moisture content measurement quickly, when it is most needed to modify the manufacturing control processes. Thus, a quantity of substandard or unacceptable material may have been produced before the moisture content data is obtained. Of course, it is generally infeasible, and sometimes impossible, to halt manufacturing operations, in the meantime, until such data becomes available.

It is an object of our invention to provide means for instantaneously measuring the moisture content of various materials.

Another object of our invention is to provide a novel circuit wherein an accurately indicating multiple range instrument is obtained.

A further object of the invention is to provide a moisture content meter in which interchangeable probes can be used to test different materials.

A still further object of our invention is to provide probes which are sensitive to the dielectric constant of a tested material and having different electrode patterns useful in measuring the moisture content of materials in various forms.

Briefly, and in general terms, the foregoing and other objects are preferably accomplished by providing a capacitance variable probe which forms part of the tank circuit of an electron-coupled oscillator, a center tuned discriminator connected as a load to the oscillator and producing a magnitude and polarity variable output voltage which is applied as a grid bias to one input of a differential amplifier, the other input being connectable to different range taps of a voltage divider, and a microammeter connected to the output of the differential amplifier to indicate the moisture content of material against which the probe is placed. The probe is a plug-in device which can be any of several novel electrode patterns for use with different materials. A Zener type diode is used to protect the microammeter against excessive current overloads.

Our invention possesses other objects and features, some of which together with the foregoing, will be set forth in the following detailed description of a preferred embodiment of the invention. The invention will be more fully understood by reading the detailed description with joint reference to the attached drawings, in which:

FIGURES 6 and 7 are drawings which illustrate a preferred exterior structural arrangement of the moisture content meter;

FIGURE 8 is a drawing showing a multiple ring probe pattern;

FIGURE 9 is a drawing illustrating a probe pattern similar to that of FIGURE 5;

FIGURES 10 and 11 are detail drawings of a roller type probe for use with rotating rolls of paper, for example;

FIGURES 12 and 13 are detail drawings of a tubular roller type electrode for a roller probe wherein conducting shells mounted on a shaft through bearings are used;

FIGURE 14 is a graph illustrating a calibration curve obtained from plotting percent moisture content of newsprint paper against instrument dial reading; and FIGURE 15 is a graph showing a curve for the output voltage from the discriminator versus impressed input frequency.

Figure 1:
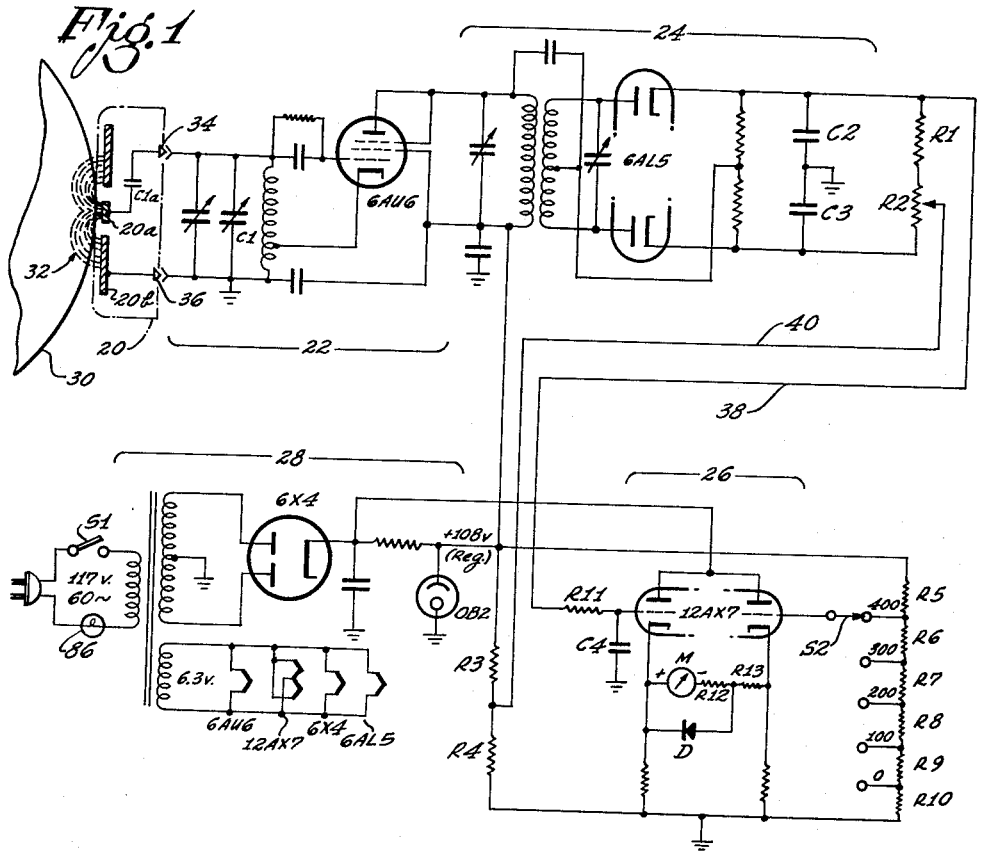
FIGURE 1 is a circuit diagram of a preferred embodiment of our invention.

A wiring diagram of a preferred embodiment of our invention is shown in FIGURE 1. The invention generally comprises a novel circuit including a probe 20, oscillator 22, discriminator 24, differential amplifier 26, and power supply 28. The probe 20 is a capacitance sensitive device which can be any version of several independently novel configurations to be described later. As is well known, an electrical condenser can be composed of two conducting bodies which are separated by a non-conducting medium, or dielectric. A simple condenser, for example, consists of two parallel plates of copper separated by mica. The capacitance C of such a condenser is equal to $Ak/4\pi t$ electrostatic units, where A is the face area (sq. cm.) of a plate, $k$ is the dielectric constant of mica, and $t$ is the separation (cm.) between plates. The relationship exemplified here indicates that the capacitance C depends on the type of dielectric used and the configuration of the condenser. Thus, capacity of a system is governed directly by the constant of dielectric, and is also dependent upon the geometry of the electrostatic field in the system.

The configuration of probe 20, diagrammatically illustrated in FIGURE 1, can comprise two conducting bodies 20a and 20b which are separated by a small air gap surrounding the inner body 20a, and is particularly suited for measuring the moisture content of a roll 30 of paper, for example, having a curved, cylindrical surface. Flux penetrations into the paper roll are schematically indicated by broken lines 32. The probe 20 configuration does not provide deep flux penetrations, into the paper roll 30 since only the moisture content of the later, most recently wound paper is to be measured, and periodic readings are made from start to finish of the winding operation. The dielectric constant of dry paper is around 2.5, and about 80 for pure water. The dielectric constant of the system can accordingly vary between these limits for various degrees of moisture saturation. Even minute quantities of moisture can be easily detected because of the relatively higher value of the dielectric constant for water, which will markedly affect the value of the dielectric constant for the system. Thus, the capacity between plug terminals 34 and 36 is directly variable with the moisture content of paper roll 30 as sensed by probe 20.

The plug terminals 34 and 36 engage respective jacks that effectively connect the capacitance probe 20 across the tank circuit of a conventional electron-coupled oscillator 22, and the probe 20, of course, becomes part of the tank circuit. The probe 20 can include a coupling capacitor C1a, and tank capacitor C1 can be varied to adjust zero setting of the instrument. The oscillator 22 operates normally for a pre-selected paper moisture content at a center frequency of 10.7 megacycles/second, for example. This frequency is varied lower or higher, respectively, for greater or lower moisture content as sensed by probe 20 than the pre-selected moisture content. The oscillator 22 load is the center tuned discriminator 24, which is also substantially conventional. Capacitors C2 and C3 are high frequency bypass condensers, and a discriminator output voltage is obtained across series-connected resistors R1 and R2 which form a voltage divider. A discriminator output voltage of from +10 volts to −10 volts, for example, can be obtained between leads 38 and 40. This output voltage varies according to the moisture content being measured by probe 20 and is zero at the oscillator center frequency of 10.7 megacycles/second, for example. The resistor R2 is variable so that the discriminator output voltage can be adjusted for time changes in value of circuit components, which may be necessary only over extended periods of time.

The power supply 28 is also conventional and includes a full wave rectifier to provide a direct voltage which is conventionally filtered and regulated. This regulated supply voltage is applied to oscillator 22, and across two voltage dividers. One divider is composed of two series-connected resistors R3 and R4, and the other is composed of six consecutive series-connected resistors R5, R6, R7, R8, R9 and R10. Lead 40 is connected to the common junction between resistors R3 and R4, and lead 38 is connected to the control grid of the left triode section of differential amplifier 26 through resistor R11. The output voltage of the discriminator 24 is effectively connected as a variable grid bias for the left triode section of differential amplifier 26. This grid bias varies in magnitude and polarity with the frequency change from the tuned center frequency of the output of oscillator 22, which is governed by the capacitance sensed by the probe 20. A positive discriminator output voltage (lead 38 positive relative to lead 40) is applied as a positive grid bias to the left triode section of differential amplifier 26, and a negative discriminator output voltage is applied as a negative grid bias to the left tube. A capacitor C4 is connected between the control grid of the left triode section and ground, as shown. The resistor R11 and capacitor C4 comprise an integral damping network which prevents overshoot of meter indications, or fluctuations of reading when used on a rotating roll, for example.

Switch S1 of the power supply 28 is part of a wafer switch which includes switch S2. The switch S2 connects the control grid of the right triode section of differential amplifier 26 to different contacts connecting with the common junctions between series resistors R5 through R10. The switch S1 is open when a range selector knob (FIGURE 7) is placed in the "off" position, which is in the extreme counterclockwise direction. The range knob can be rotated in six discrete steps clockwise from the "off" position. Switch S1 remains closed throughout all six positions of the range knob. Switch S2, however, remains connected with the terminal connecting with the common junction between resistors R9 and R10 (FIGURE 1) when the range knob is in the "off" position, or when placed in the next immediate two positions following. Further clockwise rotation of the range knob will move the switch S2 off the common junction terminal (FIGURE 1) labeled "0" to terminals which are labeled to correspond with meter range markings against which the range knob points. A mechanical stop is provided for the last, extreme clockwise range knob position to prevent further clockwise rotation of the knob similar to that provided at the "off" position which prevents further counter-clockwise rotation.

The effect of moving the switch S2 through the six range steps is to increase the voltage applied to the control grid of the right triode section from approximately 15 volts, for example, in the first position (terminal "0") by voltage steps of five volts so that a right grid voltage of approximately 35 volts exists for the last range position (terminal "400"). The mid-point grid voltage (terminal "200") can correspond in magnitude with the voltage across resistor R4 by selecting appropriate values of resistors R3 and R4. For a zero discriminator 24 output voltage, then, the voltage applied to the control grid of the left triode section of the differential amplifier 26 is equal to that applied to the control grid of the right triode section when switch S2 is connected with the midpoint (terminal "200") of the voltage divider including the series resistors R5 through R10. The two triode sections are connected as a cathode output coupled differential amplifier 26 wherein meter M, a 200 microampere meter, for example, is connected in series with two series-connected resistors R12 and R13, and this series combination of three elements connects the cathodes of the two triode sections together. A Zener type diode D is connected to shunt the series subcombination of meter M and resistor R12, in the orientation shown in FIGURE 1. The Zener type diode D is a protective device for meter M and will break down at a meter current of about 300 microamperes, for example, and conduct reverse current around the meter M thus preventing excessive meter current in either the forward or reverse directions. The differential amplifier 26 is conventional otherwise, and a zero meter reading is obtained whenever the grid voltages on both triode sections of the differential amplifier are equal.

The probe 20 plugs into a jack receptacle located in the back of the moisture content meter as show in FIGURE 6. Probe 20 comprises a probe base 42 having a Fiberglas printed circuit face plate 44 attached to the top of base 42. The base 42 as illustrated in FIGURE 6 is a hollow, open ended rectangular housing having a relatively large circular cutout centrally located in the closed end face of the housing. The plate 44 can have various novel printed circuit patterns etched on it, for different moisture sensing applications. The plate 44 is generally rectangular to conform with the shape of the top of probe base 42 and is secured to the top of the housing near the four corners by flat-head screws 46, countersunk to be flush with the surface of the plate 44. The screws 46 each pass through a tubular spacer which support another Fiberglas plate 48 at the corners, and nuts are tightened on the screws 46 firmly against the plate 48. The plate 48 mounts banana type plugs 50 which would correspond to plug terminals 34 and 36 in FIGURE 1. The plugs 50, of course, connect with separate parts of the printed circuit pattern on plate 44, through the cutout in the housing base 42. The conducting layer of the printed circuit, i.e., the pattern, is exposed inwardly, directly towards the plate 48, in this instance, so that the probe 20 appears to have a plain, rectangular sheet of insulating Fiberglas attached to the top of a rectangular base 42.

Figure 2:
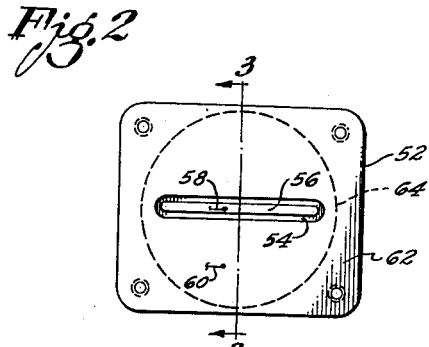
FIGURES 2 and 3 are detail drawings of a printed circuit probe plate having an etched pattern useful for measuring the moisture content of a stationary roll of paper, for example.
Figure 3:

A printed circuit pattern which performs effectively and accurately in measuring the moisture content of a stationary non-rotating roll of paper, for example, is illustrated by the drawings of FIGURES 2 and 3. FIGURE 2 is a back view (pattern side) of a plate 52 which can be attached to the top of the housing base 42 directly over its central cutout, such that upper and lower edges of the plate 52 as shown in FIGURES 2 and 3 are parallel respectively with the normally top and bottom edges of the instrument as illustarted in FIGURES 6 and 7. The plate 52 is, for example 3¼ inches wide, 3¾ inches long, and ⅟₁₆ inch thick. The metallic conducting layer is very thin and has been etched to produce an elongated circular slot 54 approximately ⅛ inch wide which surrounds a central strip 56 of the conducting layer. The central strip has rounded ends and is, for example, 2½ inches long and ⅛ inch wide. Leads 58 and 60 connect respectively with the central strip 54 and the outer, surrounding conducting area 62. The lead 60 connecting with the large surrounding conducting area 62 is normally grounded. In use, the central conducting strip 54 is pressed against a roll of paper, for example, such that the central conducting strip 54 (corresponding to body 20a)

is aligned lengthwise, parallel with the axis of the roll, as is schematically illustrated in FIGURE 1. The probe 20 can be rocked slightly on the surface of the roll on the central longitudinal axis of the conducting strip 54, and also simultaneously twisted or rotated on a central axis perpendicular to the plane of the sensing plate to attain this position, which will produce a symmetrical and uniform flux pentration pattern across an air gap including a portion of the roll. Sensing area is fully utilized and the air gap is reduced to a minimum such that the capacitance detected and, therefore, the instant meter indication, is a maximum. The broken line circle 64 shown in FIGURE 2 indicates the relative size and location of the cutout in the top face of the probe housing.

Figure 4:
FIGURES 4 and 5 are detail drawings of another printed circuit plate for the moisture content meter probe and bearing an etched pattern which is particularly effective in testing material such as fiberboard.
Figure 5:
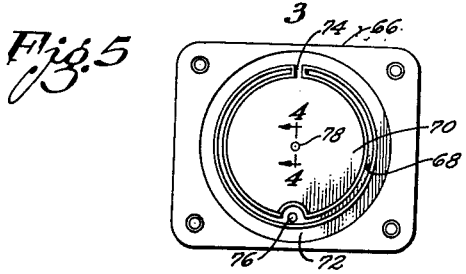

A probe printed circuit pattern which is particularly effective for measuring the moisture content of sheets of fiberboard (Masonite) and similar material is shown in FIGURES 4 and 5. The metallic conducting layer in this instance is located directly on top of the probe. The drawing of FIGURE 5 shows a head-on plan view of a plate 66 which can be mounted on top of a probe housing. In contrast, the view of plate 52 as shown in FIGURE 2 is a rear view. By having the printed circuit pattern placed directly in contact with a sheet or piece of fiberboard, or the like, a very sensitive probe can be obtained. The pattern illustrated in FIGURE 5 produces a thin flux penetration into the tested material, is sensitive but not to irregularities in moisture distribution since an extended area is covered and sampled by the probe pattern. A narrow, substantially circular ring 68 of relatively large diameter is separated from an inner disc 70 by a circular ring gap which surrounds the inner disc 70. The circular ring 68 is in turn separated by another circular ring gap from an outer ring 72. The outer ring 72 is connected to the inner disc 70 by a small conducting strip 74 that makes a break in the circular ring 68 and its two surrounding ring gaps. A copper, flat head rivet 76 is installed in a countersunk hole at an enlarged ring area and fastens a right angularly bent terminal lug firmly against the Fiberglas side of the plate 66. Another rivet 78 is positioned in the center of inner disc 70, and a cross sectional view of the installation is shown in FIGURE 4. In the riveting process, as the rivet head is drawn flush with the surface of inner disc 70, the conducting (copper) layer is actually crimped inwards to provide a good electrical contact with the rivet 78. The conducting layer areas are then chrome plated against abrasive wear, if desired. A connecting lead can be soldered to the terminal lug 80 held by the rivet 78 as indicated in FIGURE 4. The inner disc 70 is preferably connected to a ground lead. The diameter of the inner disc 70 can be approximately 2 7/16 inches, the circular ring 68 and surrounding ring gaps each less than 1/16 inch wide, and the outer ring nearly 3/16 inch wide, for example.

The sensing probe can be located remotely and separately from the main instrument body itself, and connected by suitably long leads. However, an integral device can be handled far more easily, and the novel structural configuration illustrated in FIGURES 6 and 7 was found particularly practical and useful. The probe section plugs into the lower part of the back of a standard instrument box housing 82. The meter M is positioned normally in the upper front half of the housing 82 as shown in FIGURE 7. A protruding handle 84, which is generally U-shaped (FIGURE 6), is attached centrally to the lower front half of the instrument. The dial has a linear scale with equal divisions and markings from 0 to 100. The range selector knob for switch S1 and S2 is positioned to the left of the handle 84, and a zero adjustment knob for varying the capacitor C1 is located to the right of the handle 84. A power "on-off" indicator lamp 86 is located below the range knob near the left corner of the instrument. Three rubber button rests 88 are attached to the bottom of the instrument, two to the box housing 82 and one to the end of the handle 84. The instrument normally stands conveniently in an upright position as illustrated in FIGURES 6 and 7 when not actually in use.

The moisture content meter can also be used to measure the moisture content of bales, bundles, or piles of cloth, fabric or paper, and other similar materials. Probes having patterns as illustrated in FIGURES 8 and 9 can be used in such measurements. Fiberglas plates 90 and 92 are rear views similar to that of FIGURE 2 wherein the pattern or conducting layer does not contact the tested material. Of course, the pattern can be located on the top of the plates but this is not particularly desirable or necessary with such soft material which may be quite wet at times. The pattern illustrated in FIGURE 8 is a multiple ring pattern wherein four concentrically spaced rings 91 of conducting material are alternately connected together by radial connecting strips 93a and 93b as shown. The rings are approximately 1/16 inch wide and are separated by approximately 3/16 inch, for example. The outermost ring is normally connected to the ground lead. An even number of rings which are divided into two groups are preferably used although an odd number of more than one ring can also be used. The pattern shown in FIGURE 9 is substantially the same as that shown in FIGURE 5 except that full and complete rings are employed. This is possible because jumper wires, such as 95, can be used on the back side of the probe plate 92. The relatively large broken line circles 64 represent the cutout in the top face of the probe housing in both FIGURES 8 and 9.

Frequently, it is desired to measure the moisture content of a rotating roll of paper, for example, without having to stop it in order to obtain an accurate reading. The novel roller probe pattern shown in FIGURES 10 and 11 is especially suited for this purpose, and can also be used with a non-rotating roll. Two cylindrical rollers 94 and 96 of proper size (diameter) and parallel (lateral) separation serve as two electrodes which are placed against the curved surface of a rotating roll, and act as the two conducting bodies of a capacitor. The rollers 94 and 96 are preferably fabricated from anodized aluminum 3½ inches long and 1¼ inches in diameter, for example. An axial hole is centrally drilled in each roller to closely accommodate a 3/8 inch steel shaft so that the rollers can rotate freely. The ends of the steel shafts 98 and 100 are supported and fixed in four end plates 102 which are attached upright to a base plate 104 (of Bakelite) by screws 106. The end plates 102 can also be fabricated from anodized aluminum and each plate is partially drilled to provide a short hole for receiving an end of a steel shaft. The steel shafts can be fixed by means of a small set screw (not shown) in each end plate engaging the side of the end of a steel shaft. The steel shafts are mounted at the same level above the surface of the Bakelite base plate 104 parallel to each other as shown. Banana type plugs 108 and 110 are screwed into the recessed bottom of the base plate 104 and are electrically connected to respective rollers through an end plate screw 106 (FIGURE 11) which attaches an end plate 102. A good electrical contact is made by the long steel shaft portion which supports an aluminum roller. The aluminum to steel combination of materials also produces a highly satisfactory bearing arrangement. The end plates 102 are closely spaced to the aluminum roller ends and permit very little end play. Of course, the end plates 102 can be replaced by two wide end plates which can each mount corresponding ends of both rollers, and can be fabricated from non-conducting materials if suitable conducting paths are provided. It should be noted that rotation of the metallic rollers 94 and 96 does not affect circuit behavoir because of the very high frequencies involved.

Where it is not desired that solid rollers be used, and that lighter rollers are employed to test rotating material, the novel tubular roller configuration illustrated in FIG- URES 12 and 13 can be used in place of the solid rollers 94 and 96. A stationary shaft 112 of suitable conducting material such as aluminum can be supported on its two ends 114 and 116 which can be respectively mounted in a pair of end plates such as the end plates 102. Bearings 118 and 120 are pressed onto the ends 114 and 116, respectively, and rotatably mount a tubular, cylindrical conducting shell 122 of aluminum, for example, which fully encloses the inner, stationary shaft 112. In this way, the outer conducting shell 122 contacts and rotates with a roll of paper, for example, being tested. A version providing a non-conducting contact surface can be obtained by having the outer shell 122 constructed from printed circuit material. Thus, in FIGURE 12, the inside surface of the shell 122 is metallic and an electrical connection is obtained through the bearings 118 and 120, in this version, to the ends 114 and 116. Similarly, the rollers 94 and 96 in FIGURES 10 and 11 can be coated with a thin non-conducting layer of insulating plastic material if direct metallic contact is not desired.

Operation of the moisture content meter is simple and direct. The range selector knob is rotated from the "off" position to the next, standby, position or to any of the subsequent range markings, and the instrument is allowed to warm up a few minutes. The zero adjust knob is then rotated to secure an accurate zero needle indication and then the probe is pressed against the material to be tested. A calibration chart is provided from which the moisture content can be directly read. The curve 124 plotted in the chart shown in FIGURE 14 is for newsprint paper and is seen to be quite linear except for very low moisture contents. Instrument dial reading is plotted against percent moisture content by dry weight. By dry weight is meant the difference in weight of a sample as tested and when it is thoroughly dry, divided by the dry weight. Multiplying this ratio by 100 would give the percent moisture content by dry weight. A 20 percent moisture content for newsprint exists, for example, when the dial reading of the instrument reads zero during a test for a range knob setting against the "300" range marking.

Assuming that the oscillator 22 has been properly set to operate normally at a frequency of 10.7 megacycles/second for a 20 percent moisture content newsprint sample being tested, the output voltage from discriminator 24 would be zero, since the adjustable capacitors across the discriminator transformer windings are both tuned to resonance for their respective circuits at this frequency. The 10.7 megacycles/second frequency corresponds to the point labeled $f_c$ of curve 126 in the graph of FIGURE 15, which is a plot of output voltage from the discriminator 24 against impressed frequency. The rectified output voltage between impressed frequencies of $f_1$ and $f_2$ (operating limits) is a substantially linear function of the impressed oscillator frequency. The discriminator output voltage becomes increasingly positive or negative as the oscillator 22 frequency decreases or increases, respectively, corresponding with increasing or decreasing moisture content from, for example, the 20 percent point. Since an increasing positive discriminator output voltage is applied as an increasing positive grid bias to the left triode section of the differential amplifier 26 (FIGURE 1), and an increasing negative discriminator output voltage is applied as an increasing negative grid bias to the left triode, the grid potential of the left triode becomes more positive with increasing moisture content and more negative (less positive) with decreasing moisture content. Thus, the left and right grid potentials of the differential amplifier 26 are correctly balanced for suitable meter M indications over all of the several different ranges.

A novel and useful moisture content meter has been described in detail. While some component types and dimensions have been indicated, these have been given as examples only. It is to be understood that the particular embodiment of the invention described above and shown in the attached drawings is merely illustrative of and not restrictive of the broad invention, and that various changes in design, structure and arrangement may be made without departing from the spirit and scope of the broader of the appended claims.

We claim:
1. A moisture content meter, comprising: a capacitance sensitive probe adapted to interact with material to be tested; an electron-coupled oscillator connected to said probe, said oscillator producing an output signal which is variable in frequency according to capacitance changes from a preselected value as sensed by said probe and induced by the material tested; a center tuned discriminator connected as a load to said oscillator for demodulating the oscillator output signal, said discriminator having an ungrounded output to provide a direct voltage which is proportional in magnitude and polarity to the frequency change of the oscillator output signal; a cathode output-coupled differential amplifier having first and second inputs and an output; a first voltage divider for providing a ground referenced direct voltage which is applied in series with the discriminator direct voltage to the first differential amplifier input; a second voltage divider for providing another ground referenced direct voltage to the second differential amplifier input; and a meter adapted to be connected to the differential amplifier output coupling cathodes of said differential amplifier together, whereby variation of the discriminator output voltage produces a meter indication according to the moisture content of the material tested.

2. A moisture content meter, comprising: a capacitance sensitive probe adapted to interact with material to be tested; an electron-coupled oscillator connected to said probe, said oscillator producing an output signal which is variable in frequency according to capacitance changes from a preselected value as sensed by said probe and induced by the material tested; a center tuned discriminator connected as a load to said oscillator for demodulating the oscillator output signal, said discriminator having an ungrounded output to provide a direct voltage which is proportional in magnitude and polarity to the frequency change of the oscillator output signal; a cathode output-coupled differential amplifier having first and second inputs and an output; integral damping means connected to the first differential amplifier input; a first voltage divider for providing a ground referenced direct voltage which is applied in series with the discriminator direct voltage to the first differential amplifier input through said integral damping means; a second voltage divider for providing another ground referenced direct voltage to the second differential amplifier input; and a meter adapted to be connected to the differential amplifier output coupling cathodes of said differential amplifier together, whereby variation of the discriminator output voltage produces a meter indication according to the moisture content of the material tested, and said integral damping means prevents overshoot of meter indications and fluctuations of readings when measuring the moisture content of a moving mass of material.

3. A moisture content meter, comprising: a capacitance sensitive probe adapted to interact with material to be tested; an electron-coupled oscillator connected to said probe, said oscillator producing an output signal which is variable in frequency according to capacitance changes from a preselected value as sensed by said probe and induced by the material tested; a center tuned discriminator connected as a load to said oscillator for demodulating the oscillator output signal, said discriminator having an ungrounded output to provide a direct voltage which is proportional in magnitude and polarity to the frequency change of the oscillator output signal; a cathode output-coupled differential amplifier having first and second inputs and an output; integral damping means including a resistor and series capacitor network, the first differential amplifier input being connected across the capacitor of said network; a first voltage divider for providing a ground referenced direct voltage which is applied in series with the discriminator direct voltage to said network; a second voltage divider for providing another ground referenced direct voltage which can be varied in magnitude in discrete steps to the second differential amplifier input; a meter adapted to be connected to the differential amplifier output coupling cathodes of said differential amplifier together, said meter being responsive substantially over its full range for each discrete step of the second voltage divider direct voltage whereby the direct voltages applied to the first and second differential amplifier inputs can be progressively balanced to provide a multiple range moisture content meter; and a Zener type diode adapted to shunt said meter in reversed orientation to prevent overload thereof, whereby variation of the discriminator output voltage produces a meter indication according to the moisture content of the material tested and said integral damping means prevents overshoot of meter indications and fluctuations of readings when measuring the moisture content of a rotating roll of material and the like.

4. A moisture content meter, comprising: a capacitance sensitive probe adapted to interact with material to be tested; an electron-coupled oscillator connected to said probe, said oscillator producing an output signal which is variable in frequency according to capacitance changes from a preselected value as sensed by said probe and induced by the material tested; a center tuned discriminator connected as a load to said oscillator for demodulating the oscillator output signal, said discriminator having an ungrounded output to provide a direct voltage which is proportional in magnitude and polarity to the frequency change of the oscillator output signal; a cathode output-coupled differential amplifier having first and second inputs and an output; integral damping means connected to the first differential amplifier input; a first voltage divider for providing a ground referenced direct voltage which is applied in series with the discriminator direct voltage to the first differential amplifier input through said integral damping means; a second voltage divider for providing another ground referenced direct voltage which can be varied in magnitude in discrete steps to the second differential amplifier input; and a meter adapted to be connected to the differential amplifier output coupling cathodes of said differential amplifier together, said meter being responsive substantially over its full range for each discrete step of the second voltage divider direct voltage, whereby the direct voltages applied to the first and second differential amplifier inputs can be progressively balanced to provide a multiple range moisture content meter, variation of the discriminator output voltage produces a meter indication according to the moisture content of the material tested, and said integral damping means prevents overshoot of meter indications and fluctuations of readings when measuring the moisture content of a moving mass of material.

5. A moisture content meter, comprising: a capacitance sensitive probe adapted to interact with material to be tested; an electron-coupled oscillator connected to said probe, said oscillator producing an output signal which is variable in frequency according to capacitance changes from a preselected value as sensed by said probe and induced by the material tested; a center tuned discriminator connected as a load to said oscillator for demodulating the oscillator output signal, said discriminator having an ungrounded output to provide a direct voltage which is proportional in magnitude and polarity to the frequency change of the oscillator output signal; a cathode output-coupled differential amplifier having first and second inputs and an output; integral damping means including a resistor and series capacitor network, the first differential amplifier input being connected across the capacitor of said network; a first voltage divider for providing a ground referenced direct voltage which is applied in series with the discriminator direct voltage to said network; a second voltage divider for providing another ground referenced direct voltage to the second differential amplifier input; and a meter adapted to be connected to the differential amplifier output coupling cathodes of said differential amplifier together, whereby variation of the discriminator output voltage produces a meter indication according to the moisture content of the material tested, and said integral damping means prevents overshoot of meter indications and fluctuations of readings when measuring the moisture content of a moving mass of material.

References Cited in the file of this patent
UNITED STATES PATENTS

| | | |
|---|---|---|
| 1,991,076 | Bradshaw | Feb. 12, 1935 |
| 2,021,760 | Whitney | Nov. 19, 1935 |
| 2,071,607 | Bjorndal | Feb. 23, 1937 |
| 2,305,307 | Wellenstein et al. | Dec. 15, 1942 |
| 2,412,482 | Vilkomerson | Dec. 10, 1946 |
| 2,498,103 | Wojciechowski | Feb. 21, 1950 |
| 2,512,879 | Roggenstein | June 27, 1950 |
| 2,513,281 | Buras et al. | July 4, 1950 |
| 2,515,021 | Simpson | July 11, 1950 |
| 2,599,710 | Hathaway | June 10, 1952 |
| 2,607,828 | Razek | Aug. 19, 1952 |
| 2,777,192 | Albright et al. | Jan. 15, 1957 |
| 2,783,420 | Thompson et al. | Feb. 26, 1957 |
| 2,805,371 | Dye | Sept. 3, 1957 |
| 2,819,400 | Toth | Jan. 7, 1958 |
| 2,963,642 | Arbogast et al. | Dec. 6, 1960 |

OTHER REFERENCES

Dayton et al.: "Capacitive Micrometer" Electronics, September 1946; pages 106–111.